United States Patent
Krapf et al.

(10) Patent No.: US 8,269,479 B2
(45) Date of Patent: Sep. 18, 2012

(54) MECHANICAL SUPPORT DEVICE AND A MEASURING DEVICE WITH A MECHANICAL SUPPORT DEVICE

(75) Inventors: Reiner Krapf, Reutlingen (DE); Uwe Skultety-Betz, Leinfelden-Echterdingen (DE); Michael Mahler, Leinfelden-Echterdingen (DE); Christoph Wieland, Herrenberg-Kuppingen (DE); Ewald Schmidt, Ludwigsburg (DE); Ulli Hoffmann, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 1116 days.

(21) Appl. No.: 11/916,571

(22) PCT Filed: Jul. 3, 2006

(86) PCT No.: PCT/EP2006/063802
§ 371 (c)(1),
(2), (4) Date: Dec. 5, 2007

(87) PCT Pub. No.: WO2007/020128
PCT Pub. Date: Feb. 22, 2007

(65) Prior Publication Data
US 2011/0148392 A1    Jun. 23, 2011

(30) Foreign Application Priority Data
Aug. 17, 2005   (DE) .......................... 10 2005 039 152

(51) Int. Cl.
*G01R 19/00*   (2006.01)
(52) U.S. Cl. ........................ 324/67; 324/76.11; 324/71.1
(58) Field of Classification Search ........................ None
See application file for complete search history.

(56) References Cited

U.S. PATENT DOCUMENTS

| | | | |
|---|---|---|---|
| 1,907,755 A | 5/1933 | Drake | |
| 3,002,149 A | 9/1961 | Christian | |
| 4,318,617 A | 3/1982 | Orsen | |
| 5,296,806 A | 3/1994 | Hurl, Jr. | |
| 5,486,756 A * | 1/1996 | Kawakami et al. | 324/127 |
| 5,680,048 A | 10/1997 | Wollny | |
| 5,818,590 A | 10/1998 | Patterson | |
| 6,914,552 B1 | 7/2005 | McEwan | |
| 6,992,634 B2 | 1/2006 | Hashidate et al. | |
| 7,604,413 B2 * | 10/2009 | Koike et al. | 384/448 |
| 7,956,794 B2 | 6/2011 | Skultety-Betz | |
| 2003/0169036 A1 | 9/2003 | Hrubes et al. | |
| 2005/0104789 A1 | 5/2005 | Hashidate et al. | |
| 2007/0296955 A1 | 12/2007 | Skultety-Betz et al. | |

FOREIGN PATENT DOCUMENTS

| | | |
|---|---|---|
| DE | 198 50 748 | 5/2000 |
| DE | 101 04 863 | 8/2002 |
| DE | 102 39 431 | 3/2004 |
| DE | 10 2004 007 315 | 8/2005 |
| EP | 0 751 403 | 1/1997 |
| JP | 56-125612 | 10/1981 |
| JP | 63-225188 | 9/1988 |
| JP | 11-272827 | 10/1999 |

(Continued)

*Primary Examiner* — Melissa Koval
*Assistant Examiner* — Trung Nguyen
(74) *Attorney, Agent, or Firm* — Michael J. Striker

(57) ABSTRACT

A mechanical support device (10) for a sensor plate (18) of a device for transmitting and/or receiving electromagnetic high-frequency signals, is designed as a winding core (24, 26) of at least one coil (32, 32', 32"; 34, 34', 34"; 36, 36', 36") in an inductive sensor.

10 Claims, 4 Drawing Sheets

FOREIGN PATENT DOCUMENTS

| | | |
|---|---|---|
| JP | 11-313017 | 11/1999 |
| JP | 2000-307340 | 11/2000 |
| JP | 2005-51536 | 2/2005 |
| JP | 2005518549 | 6/2005 |
| WO | 03/073133 | 9/2003 |
| WO | 2005/078480 | 8/2005 |
| WO | 2005/080930 | 9/2005 |
| WO | 2005/081015 | 9/2005 |

* cited by examiner

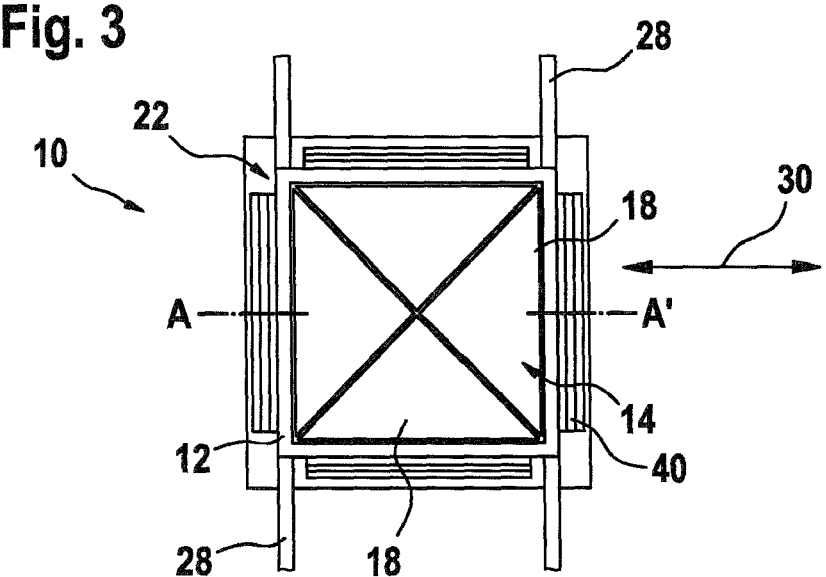
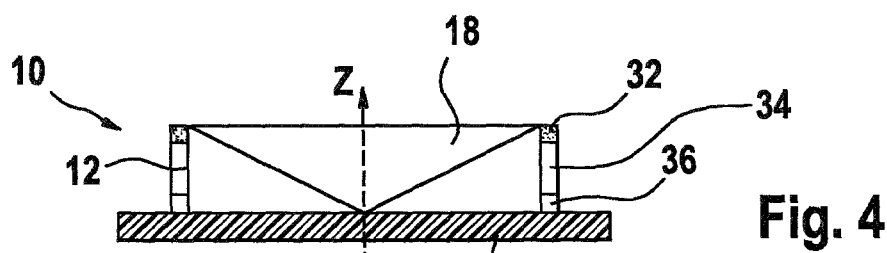
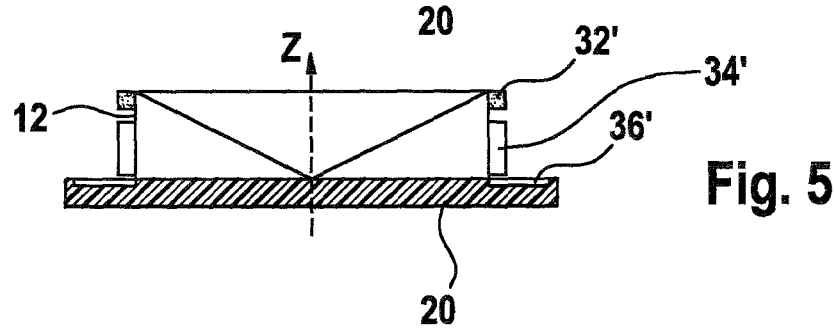
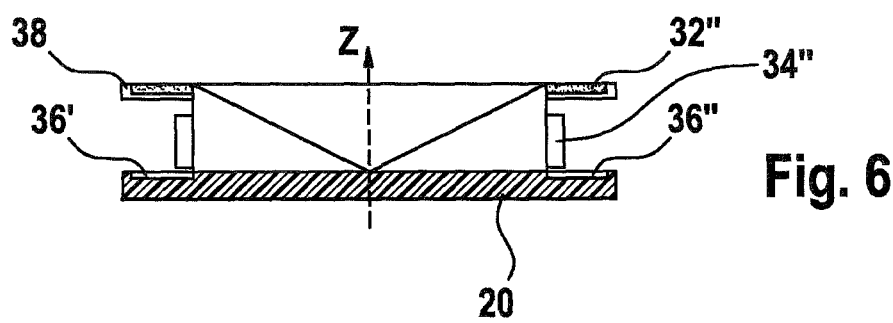

MECHANICAL SUPPORT DEVICE AND A MEASURING DEVICE WITH A MECHANICAL SUPPORT DEVICE

CROSS-REFERENCE

The invention described and claimed hereinbelow is also described in PCT/DE 02/04169, filed on Nov. 12, 2002 and DE 102 05 001.5, filed Feb. 7, 2002. This German Patent Application, whose subject matter is incorporated here by reference, provides the basis for a claim of priority of invention under 35 U.S.C. 119 (a)-(d).

BACKGROUND OF THE INVENTION

The present invention is directed to a mechanical support device for at least one sensor plate of a device for transmitting and/or receiving electromagnetic high-frequency signals, in particular a high-frequency antenna for a radar device that is operated in a frequency range of approximately 1-5 GHz.

High-frequency sensors, such as antenna, for devices that are designed to detect objects embedded in a medium, such as lines or pipes in walls, are generally optimized for transmitting and/or receiving high-frequency (HF) signals, e.g., radar signals. To this end, a device of this type includes at least one sensor plate of a high-frequency sensor that functions, e.g., as an antenna, and is fixed in place in a detector in an appropriate manner.

An antenna of this type with a planar design is made known in DE 10104863 A1. This known planar antenna is fixed in position with high mechanical stability on a printed circuit board and generates a relatively symmetrical radiation pattern with largely reduced minor lobes and/or sidelobes. The antenna is composed of an electrically conductive plate that includes two angled lateral sections on diametrically opposed edges, the angled lateral sections serving as conducting arms for coupling the antenna to a power supply network. The lateral sections of the antenna also serve to mechanically fix the planar antenna on a printed circuit board.

Publication DE 10239431 A1 makes known a locating device, in particular a hand-held locating device for detecting inclusions, preferably in walls, ceilings, and/or floors, with at least one capacitive sensor device enclosed in a housing, in the case of which at least one measuring capacity of the capacitive sensor device includes a first electrode that includes a section that extends parallel to a housing wall, the section being pressed flat against an inner side of a housing wall. To this end, the device described in publication DE 10239431 A1 includes a mechanical spacer for the first electrode, which defines the distance between the electrode and the housing wall, and secures it.

SUMMARY OF THE INVENTION

The inventive mechanical support device for at least one sensor plate of a device for transmitting and/or receiving electromagnetic high-frequency signals, e.g., an antenna element, is advantageously designed as a winding core of at least one coil in an inductive sensor.

A design of a mechanical support element of this type for at least one sensor plate and/or antenna element of a sensor makes it possible to realize a measuring device with multiple sensors, with which a compact, mechanically stable sensor system for a plurality of sensors is ensured. A holder of this type, which serves to mechanically fix an antenna element in place and serves as a winding core of at least one coil in an inductive sensor, enables the costs for the device to be reduced, it simplifies the assembly of the sensor system, and increases ease of service, since such a design of a mechanical support system ensures that the sensor head of the measuring device may be replaced easily.

Measuring devices with a plurality of sensors, of the type used, e.g., to locate objects embedded in a medium, include a plurality of different sensors that will be located in the housing of the measuring device. Measuring devices that include a plurality of sensors have clear advantages in terms of locating objects embedded in a medium.

Due to the special mechanical design of the support device, each sensor has the same measuring spot; this results in a more accurate result about the object that was detected, without the need to reference the sensors against each other or to calibrate them.

In an advantageous embodiment of the inventive support device, at least one conductor loop system—which serves as a coil—encloses the support element in the circumferential direction of the support device. The coil, which is a component of an inductive sensor of a measuring device, may be designed as a classical, wound coil or, e.g., as a printed circuit coil, in the case of which a conductive conductor loop system performs the function of the coil windings.

With the inventive mechanical support device, a plurality of conductor loop systems, which function as coils, is advantageously located concentrically to a symmetry axis of the support device.

The conductor loop systems may be located in the axial direction of the symmetry axis with a defined separation between them, and, in particular, they are offset vertically relative to each other.

The symmetry axis of the support device and, therefore, the symmetry axis of the conductor loop systems of the inductive sensor, advantageously correspond to the radiation direction of at least one antenna element or sensor plate.

In this manner, an optimal technical function is realized with an inventive support device of this type, since all sensors of the measuring device have the same measuring spot.

In an advantageous embodiment of the inventive support device, it is mechanically connected with a support PCB, on which further electronic components and at least one further sensor element are located.

In an advantageous embodiment of the inventive mechanical support device, it is designed such that it serves as a guide element for at least one connecting axle of two rolling elements. In this manner, the wheel axles of a movable measuring device, for example, may be guided using the mechanical support device for the sensor plate.

Advantageously, the mechanical support device is essentially tubular in shape, e.g., with a rectangular cross section, so that at least one sensor plate of the high-frequency sensor, e.g., an antenna element of a high-frequency sensor, may be installed in the interior space of the support device and at least one coil element of an inductive sensor may be located outside of the interior space. The guide for related axles of rolling elements of the measuring device may be provided and designed outside of this interior space of the mechanical support device.

The inventive mechanical support device advantageously makes it possible to realize a measuring device with a plurality of sensors, with which, due to the mechanical design of the support device, every sensor of the measuring device has the same measuring spot, thereby providing a more accurate result about objects that are detected. The combination of different sensor principles in a measuring device with a plurality of sensors makes it possible to simply locate an embedded object, to identify the material of the detected object, and, e.g., with electrical lines, to obtain information about the voltage state of the line. In addition, e.g., locating embedded objects using high frequency with one or more antenna elements, and the resultant estimate of the depth of an embedded object are made much more accurate, since the process of locating embedded objects using high frequency may adjust to the type of material of which the detected object is made, based on the measured results of the further sensors located in the measuring device.

As a result of the inventive mechanical support device, the sensor system of the measuring device may be fixed in position in a measuring device using simple connecting techniques, e.g., soldering, plugging, screwing, or the like.

With a hand-held measuring device that may be moved over the surface of a medium to be investigated, the wheel axles of the measuring device—which also supply a displacement signal to a displacement recorder for the measuring device—are guided via the mechanical support device of the sensor elements and are therefore stabilized.

A mechanical support device of this type, which serves to precisely locate various different sensors and serves as a guide element for wheel axles of a movable measuring device, results in a compact, mechanically stable sensor system, which is also easy to service, since it is easily replaced. Using the inventive support element, a compact measuring device with a plurality of sensors may be realized, in particular a hand-held device of this type, with which the individual sensors advantageously have the same measuring spot.

Further advantages of the inventive support device and the inventive measuring device are disclosed in the drawing below and in the related description.

BRIEF DESCRIPTION OF THE DRAWINGS

Exemplary embodiments of an inventive support device and an inventive measuring device are depicted in the drawing, and they are described in greater detail in the subsequent description. The figures in the drawing, their descriptions, and the claims contain numerous features in combination. One skilled in the art will also consider the features individually and combine them to form further reasonable combinations.

FIG. 3 shows a top view of the mechanical support device, in a simplified, schematic depiction, FIG. 4 shows a section along axis AA' in FIG. 3 for a further embodiment of the inventive mechanical support device, FIG. 5 shows a further exemplary embodiment of the mechanical support device in a sectional view along axis AA' in FIG. 3, FIG. 6 shows a further exemplary embodiment of the mechanical support device in a schematic sectional view along axis AA' in FIG. 3.

DETAILED DESCRIPTION OF THE EXEMPLARY EMBODIMENTS

Figure 1:
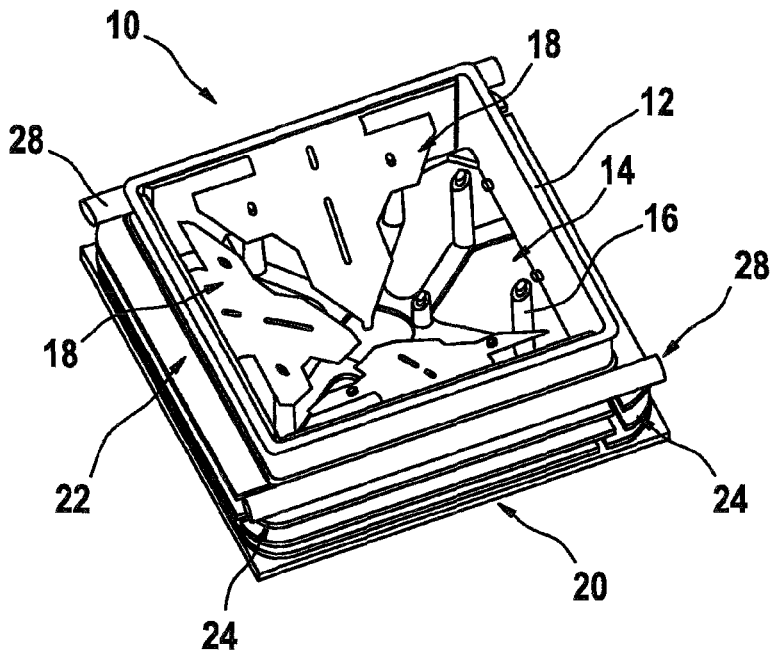
FIG. 1 shows an exemplary embodiment of the inventive mechanical support device, in a perspective overview illustration.

FIG. 1 shows a first exemplary embodiment of an inventive mechanical support device 10. The support device is a body 12 made of a non-metallic material, e.g., a plastic or another related material. Support body 12, which is designed as a plastic body in the exemplary embodiments in FIGS. 1 and 2, e.g., it is made using injection-moulding technology, is designed essentially tubular in shape and has a square cross section in the embodiment shown. Other cross-sectional shapes are also feasible. Holding elements 16 for sensor plates 18 for the high-frequency sensors are formed in interior space 14 of plastic body 12. Sensor plates 18, which form antenna elements of a radar sensor, for example, may be assembled via pressing them in place, injection, or hanging them in place, and by pressing the plates against the holder.

Plastic body 12 of the mechanical support device is located on a support PCB 20, e.g., it is bonded or clipped thereto. Further electronic components of the sensor system and, in particular, further sensors, may be advantageously located on support PCB 20. In addition, support body 12 may be contacted electrically with support PCB 20 using contact means.

On its outer side 22, plastic body 12 of mechanical support device 10 includes a plurality of circumferential, flat segments 24. The circumferential segments, which are formed in the circumferential direction on plastic body 12, have an axial separation in the direction of symmetry axis Z of mechanical support device 10 drawn in FIG. 2. Symmetry axis Z essentially corresponds to the radiation direction of the high frequency sensor formed by sensor plates 18, e.g., a radar sensor.

Mechanical support device 10 is used as a winding core for an inductive sensor system of a multiple measuring head. A plurality of coils (transmission and receiving coils) is used with an inductive sensor system of this type.

In the exemplary embodiment of the mechanical support device described, intermediate space 26 between two vertically offset segments 24 serves as a winding core for the windings of a coil in an inductive sensor.

Figure 7:
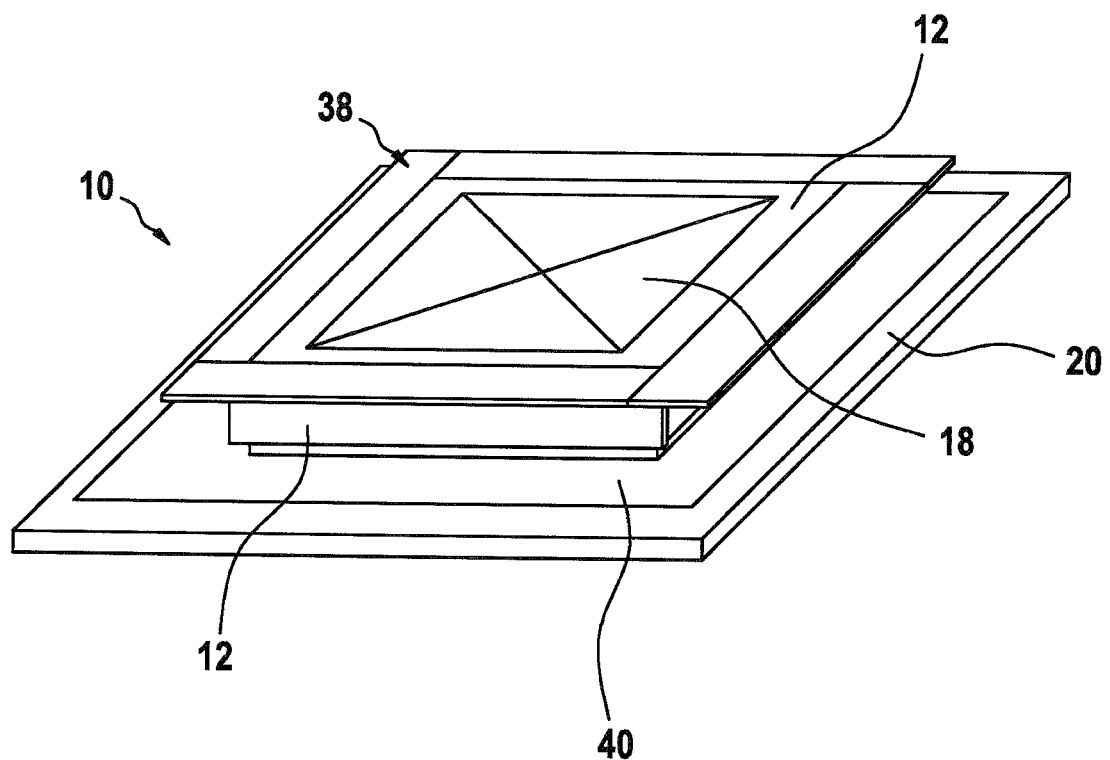
FIG. 7 shows a further exemplary embodiment of the inventive mechanical support device, in a schematicized perspective overall view.
Figure 8:
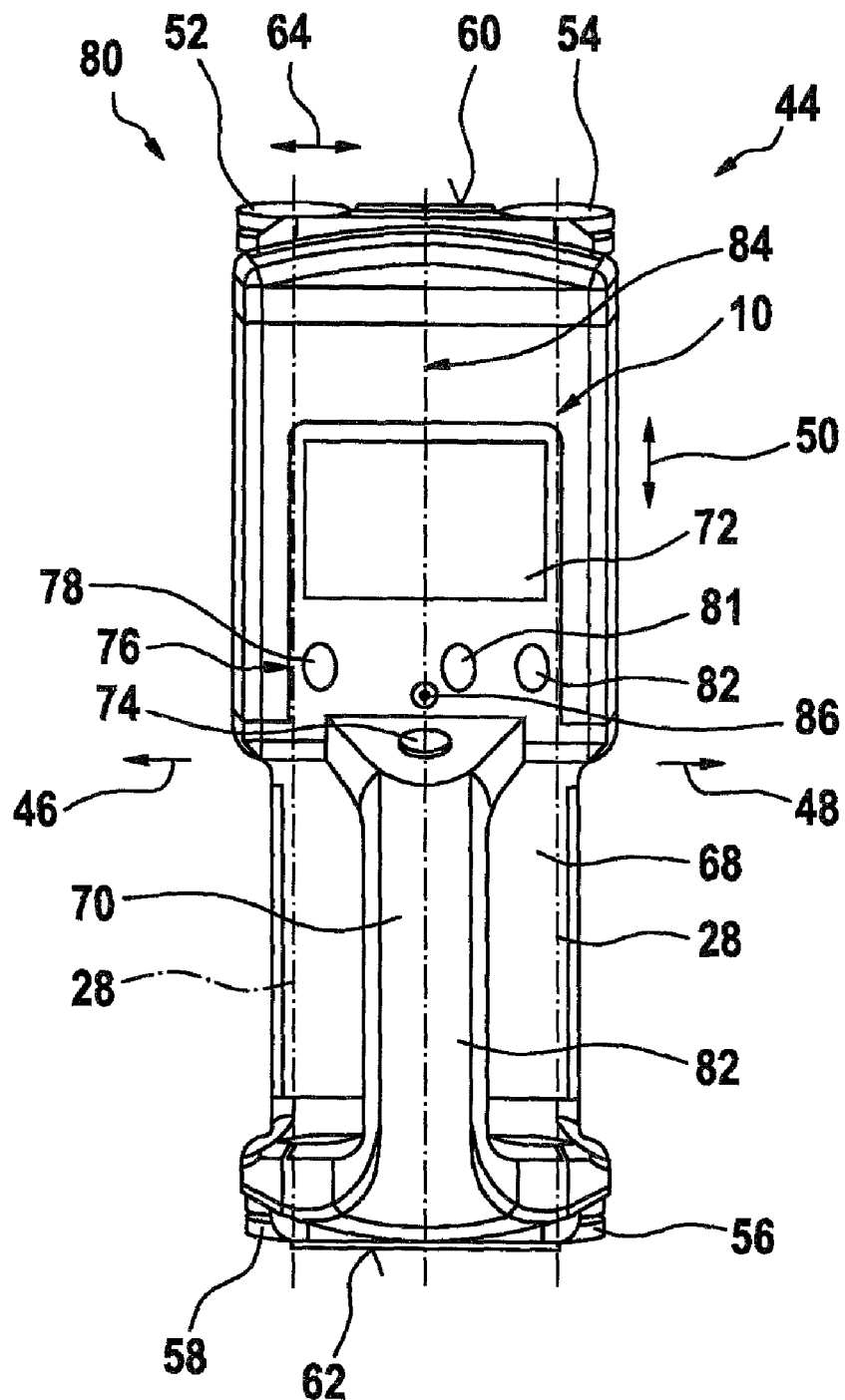
FIG. 8 shows an exemplary embodiment of an inventive measuring device.

In addition to serving as a winding core for the inductive sensor systems, plastic body 12 of mechanical support device 10 also serves as a guide for axles 28 of a measuring device, which is not shown in FIGS. 1 through 7, in particular of a hand-held, movable locating device (see FIG. 8). Rolling elements, e.g., wheels, may be located in pairs on the ends of axles 28, which are guided in an intermediate space 27 of circumferential segments 24.

FIG. 3 shows an exemplary embodiment of mechanical support device 10 in a schematicized top view. Four essentially triangular sensor plates 18 are located in interior space 14 of support body 12. Sensor plates 18 form a dual-polarized antenna, in particular in the shape of a star or funnel. Recesses 24, 26 are formed on outer side 22 of plastic body 12, which serve as winding cores for the coils of an additional inductive sensor system. Support body 12 of mechanical support device 10 also includes guide elements 26, 27 for axles 28, with which a measuring device—in which inventive mechanical support device 10 is used—may be moved in the direction of arrows 30, e.g., over a wall. Additional sensors, e.g., a capacitive sensor, may be located on the support PCB.

There are various possibilities for locating the coils of an inductive sensor system on mechanical support device 10, a few of which are depicted in FIGS. 4 through 6 in an exemplary and non-definitive manner.

In the exemplary embodiment of an inventive support device as shown in FIG. 4, support body 12 of mechanical support device 10 is fixed in position on a support PCB 20. Three coils 32, 34 and 36, which are staggered axially relative to symmetry axis Z of mechanical support device 10, are located one over the top of the other in the circumferential direction of support body 12.

The system may be composed of two transmission coils and one receiving coil, or two receiving coils and one transmission coil. The special aspect of the arrangement of these three coils 32, 34, and 36 is the fact that they are all located concentrically around common axis Z. When two transmit coils are used, they are supplied by their transmitters with alternating currents with phase opposition. The first transmission coil induces a flux in the receiving coil, which is oriented in the opposite direction from the flux induced in the receiving coil by the second transmission coil. The two fluxes induced in the receiving coil therefore neutralize each other. As such, the receiver does not detect a received signal in the receiving coil if an external, metallic object is not located near the coil assembly. Coils 32, 34, and 36 therefore form an inductive sensor in a neutralizing circuit.

FIG. 5 shows a second exemplary embodiment of the assembly of coils on support body 12 of mechanical support device 10. In the exemplary embodiment shown in FIG. 5, coils 32' and 34' are designed as classic winding spools, but coil 36' is designed as a printed circuit coil on support PCB 20. To this end, printed conductor structures that generate a conductive loop system, may be formed on support element 20 of mechanical support device 10, e.g., using phototechnology. It would also be possible to also design printed circuit coil 36'—which is located on support PCB 20—as a coil with an air core or as a coil with a ferrite core, and to locate it on the support PCB.

FIG. 6 shows a further exemplary embodiment of a sensor system using mechanical support device 10. In the exemplary embodiment shown in FIG. 6, coils 32" and 36" are designed as printed circuit coils, but coil 34" is designed as a classic, wound coil. To this end, the exemplary embodiment of mechanical support device 10 shown in FIG. 6 includes an additional PCB 38, which is positioned such that it is parallel and offset relative to support PCB 20 in the axial direction of axis Z, and on which the conductive loops of coil 32" are formed, as printed structures.

Additional PCB 38 also has adequate space for an additional capacitive sensor sensor system, which is not shown in FIG. 6, and for sensor surfaces of an additional sensor for detecting alternating voltage. An AC sensor for detecting 50/60 Hz signals may be integrated on the printed circuit boards and on or in support body 12 of mechanical support device 10. A sensor of this type may be integrated, e.g., via a conductive element such as a metal strip, in support body 12, e.g., it may be cast therein or clipped to support body. Advantageously, the AC sensor is also formed symmetrical with the Z axis of the assembly. Two AC electrodes may be installed in or on two opposite sides of support body 12.

With all of the embodiments shown, the coils may basically always be designed on the printed circuit boards as printed circuit coils or as coils with an air core, or as coils with a ferrite core. It is also possible, e.g., to located a fully-wound coil for an inductive sensor system on additional PCB 38.

FIG. 7 shows an exemplary embodiment of mechanical support device 10, with which the support device is located between two printed circuit boards 20 and 38, which are located essentially in parallel. Support body 12—mechanical support device 10, which may be composed, e.g., of plastic—is also formed as a winding core for coils in an inductive sensor system and includes, in its interior, sensor plates 18 of an antenna system of a radar sensor, in particular a UWB (ultra-wide band) radar sensor. Sensor plates 18 are stamped sheet metal parts, although they may also be manufactured of another material using another manufacturing method.

In addition, adequate space is located on support PCB 20 for a capacitive sensor system 40, an alternating voltage detector, and for further coils (printed circuit coils or fully-wound coils) of the inductive sensor system of the measuring head. The alternating voltage detector may also be installed directly in or on support body 12, e.g., in the manner described.

Optional additional PCB 38 is also fixedly connected with support body 12 of mechanical support device 10, thereby ensuring that the additional PCB—and, therefore, the additional sensors located thereon—is positioned exactly and installed easily.

Figure 2:
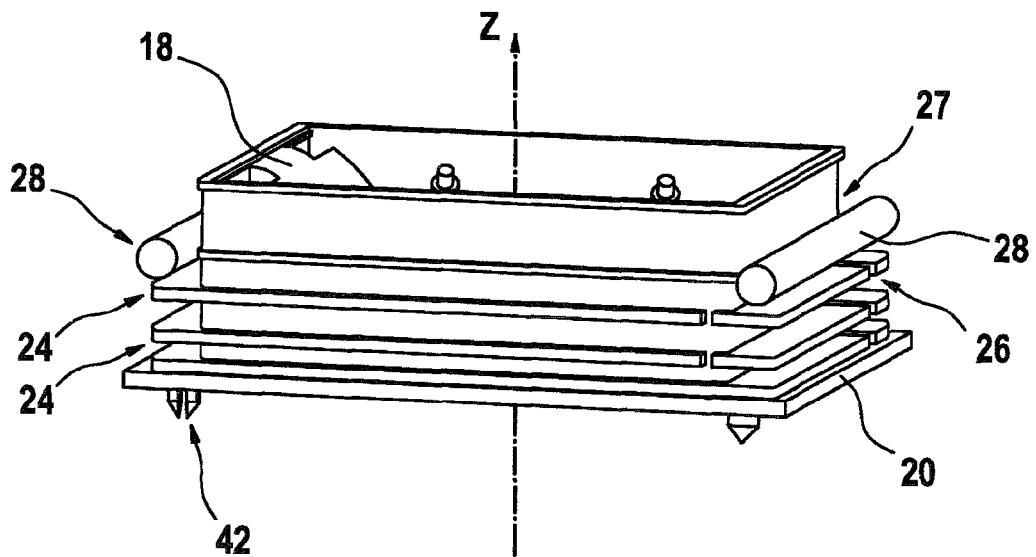
FIG. 2 shows the exemplary embodiment of the mechanical support device in FIG. 1, in a side view.

Support PCB 20 may be located and fixed in position in the interior of the housing of a measuring device using holding elements, e.g., snap-in elements 42, as shown in FIG. 2.

FIG. 8 shows a hand-held locating device 80 for detecting objects embedded in a medium using a plurality of sensors, as an exemplary embodiment of an inventive measuring device. In a measuring device of this type, the plurality of sensors are positioned and fixed in place in the interior of the device using inventive mechanical support device 10.

Housing 44 of this locating device is movable in two preferred, opposite directions of motion 46 and 48, which extend perpendicularly to a longitudinal extension 50 of housing 44 of the measuring device. Locating device 80 includes four rolling elements 52, 54, 56 and 58, which are designed as wheels and are located in longitudinal extension 50 of the device on diametrically opposed end faces 60 and 62, in the transverse extension of the device in its outer region. Rolling elements 52 and 58, and 54 and 56, which are diametrically opposed in longitudinal extension 50, are non-rotatably connected with each other via rigid axles 28. Rigid axles 28 are guided by mechanical support device 10 such that mechanical support device 10 serves as an axial guide for movable device 80.

To record parameters of motion, locating device 80 includes a sensor unit with two sensors, in particular, with which the parameters of motion may be detected. To this end, segmented wheels are mounted on axles 28 in a not-shown manner; the segmented wheels move in fork light barriers, thereby enabling the direction of motion of the device to be detected.

Housing 44 of measuring device 80 includes a holding device 70 on its top side 68 that is formed by a C-shaped handle 82. Holding device 70 extends in longitudinal extension 50 of housing 44. Using holding device 70 and wheels 52, 54, 56 and 58, the measuring device may be guided over the surface of a medium to be investigated, e.g., a wall, a floor, or a ceiling.

On its end facing a graphical display 72, holding device 70 includes a first operating element 74, with which a measuring procedure for locating an embedded object may be started or ended. A keypad 76 is located between holding device 70 and screen 72 of device, which is designed as a graphical display. Keypad 76 includes various measurement buttons 78, 81, 82, with which, e.g., different sensors of the multiple sensor system of the measuring device may be switched on or off.

Inventive mechanical support device 10, on which the multiple sensor system is located, is located in top part 84 of the measuring device facing away from holding element 70, and which is indicated schematically using a dashed line in FIG. 8. Sensor plates 18 of the high-frequency sensor are oriented toward the underside of housing 44, which is hidden in FIG. 8, so that symmetry axis Z of mechanical support device 10, which is the same as the radiation direction of the antenna assembly, points into the plane of the drawing in FIG. 8, as indicated with reference numeral 86 in FIG. 8.

The inventive measuring device, in particular a hand-held locating device for detecting objects embedded in a medium, includes a multiple sensor system, in particular a high-frequency sensor system, e.g., one or more radar antenna in a frequency range between approximately 1 and GHz. The inventive measuring device also includes an inductive sensor for locating metallic objects. The high-frequency sensor plates and the coil assemblies of the inductive sensor are positioned relative to each other by a mechanical support device and, overall, as a multi-sensor element in the housing of the measuring device. The mechanical support device may be mounted directly on a support PCB of the measuring device, which includes further electronic control elements for operating the measuring device. Further sensors, such as capacitive sensors, mains voltage detectors, which may detect the alternating voltage field of a mains voltage line in a capacitive and passive manner, i.e., without generating an electrical field, and one or more capacitive, high-frequency detectors may be located in recesses of mechanical support device 10 or an assigned support PCB such that each sensor in this multiple sensor system has the same measuring spot; this results in a more accurate result about the object that was detected.

Due to the mechanical support device, which is designed as a multi-function holder, a compact, easily serviced measuring device with a mechanically stable sensor assembly may be realized.

The inventive mechanical support device and a related measuring device, in particular a locating device with an inventive mechanical support device are not limited to the exemplary embodiments depicted in the drawings and in the description.

In particular, a measuring device of this type is not limited to the sensor types depicted in the exemplary embodiments. Further sensors, e.g., infrared sensors, ultrasonic sensors, or the like may also be integrated on or in the mechanical support device.

What is claimed is:

1. A mechanical support device (10) for at least one sensor plate (18) of a device for transmitting and/or receiving electromagnetic high-frequency signals, wherein the support device (10) is designed as a winding core (24, 26) of at least one coil (32, 32', 32"; 34, 34', 34"; 36, 36', 36") in an inductive sensor, wherein a majority of conductor loop systems, which serve as coils (32, 32', 32"; 34, 34', 34"; 36, 36', 36"), are located concentrically to a symmetry axis Z of the support device (10), wherein symmetry axis Z of the support device (10) corresponds to the radiating direction of the at least one sensor plate (18).

2. The support device as recited in claim 1, wherein at least one conductor loop system, which serves as a coil (32, 32', 32"; 34, 34', 34"; 36, 36', 36"), encloses the support element (10) in the circumferential direction.

3. The support device as recited in claim 1, wherein the conductor loop systems are positioned such that they are offset vertically relative to each other in the axial direction of symmetry axis Z.

4. The support device as recited in claim 1, wherein the support device (10) includes at least one receptacle for at least one further sensor, in particular an AC sensor.

5. The support device as recited in claim 1, wherein the support device (10) is mechanically connected with at least one support PCB (20, 38), on which at least one further element of a sensor (40) is provided.

6. The support device as recited in claim 5, wherein the support device (10) is electrically contacted with the at least one support PCB (20, 38).

7. The support device as recited in claim 1, wherein the support device (10) is designed as a guide element (26, 27) of at least one connecting axle (28) of two rolling elements (52, 54, 56, 58).

8. The support device as recited in claim 1, wherein the support device (10) is designed essentially tubular in shape, in particular with a rectangular cross section, with at least one sensor plate (18) being located in the interior space (14) of the support device, and the at least one coil (32, 32', 32"; 34, 34', 34"; 36, 36', 36") being located outside of this inner space (14).

9. A measuring device with multiple sensors, in the form of a hand-held locating device (80) for detecting objects embedded in a medium, with a device for transmitting and/or receiving electromagnetic high-frequency signals, wherein the measuring device (80) includes at least one support device (10) for supporting at least one sensor plate, wherein the at least one support device (10) is designed as a winding core (24, 26) of at least one coil (32, 32', 32"; 34, 34', 34"; 36, 36', 36") in an inductive sensor, wherein a majority of conductor loop systems, which serve as coils (32, 32', 32"; 34, 34', 34"; 36, 36', 36") are located concentrically to a symmetry axis Z of the support device (10), wherein symmetry axis Z of the support device (10) corresponds to the radiating direction of the at least one sensor plate (18).

10. The measuring device as recited in claim 9, wherein the measuring device includes a plurality of rolling elements (52, 54, 56, 58), which are connected in pairs with an axle (28), the axles (28) being guided using the support device (10).

* * * * *